United States Patent
Galarza

(10) Patent No.: US 9,457,857 B2
(45) Date of Patent: Oct. 4, 2016

(54) TRIM PART AND METHOD FOR PRODUCING A TRIM PART

(71) Applicant: Faurecia Interieur Industrie, Nanterre (FR)

(72) Inventor: Juan Medina Galarza, Valencia (ES)

(73) Assignee: Faurecia Interieur Industrie, Nanterre (FR)

( * ) Notice: Subject to any disclaimer, the term of this patent is extended or adjusted under 35 U.S.C. 154(b) by 94 days.

(21) Appl. No.: 14/015,275

(22) Filed: Aug. 30, 2013

(65) Prior Publication Data
US 2014/0167434 A1    Jun. 19, 2014

(30) Foreign Application Priority Data

Aug. 31, 2012   (EP) .................................... 12182671

(51) Int. Cl.

| | |
|---|---|
| B32B 3/30 | (2006.01) |
| B62D 65/14 | (2006.01) |
| B32B 7/08 | (2006.01) |
| B32B 9/02 | (2006.01) |
| B32B 9/04 | (2006.01) |
| B32B 27/06 | (2006.01) |
| B32B 27/30 | (2006.01) |
| B32B 27/32 | (2006.01) |
| B60R 13/02 | (2006.01) |

(52) U.S. Cl.
CPC ................. *B62D 65/14* (2013.01); *B32B 3/30* (2013.01); *B32B 7/08* (2013.01); *B32B 9/025* (2013.01); *B32B 9/045* (2013.01); *B32B 27/065* (2013.01); *B32B 27/302* (2013.01); *B32B 27/304* (2013.01); *B32B 27/32* (2013.01); *B60R 13/02* (2013.01); *B32B 2451/00* (2013.01); *B32B 2605/003* (2013.01)

(58) Field of Classification Search
CPC ........... B32B 7/08; B32B 3/30; B60R 13/02; B60N 2/5883; B68G 7/05
USPC .............................. 428/102; 112/136; 156/93
See application file for complete search history.

(56) References Cited

U.S. PATENT DOCUMENTS

| | | | |
|---|---|---|---|
| 4,973,507 A | 11/1990 | Horian | |
| 2006/0113762 A1* | 6/2006 | Tracht et al. | 280/730.2 |
| 2007/0014969 A1 | 1/2007 | Olley et al. | |
| 2008/0093830 A1 | 4/2008 | Takezawa et al. | |

FOREIGN PATENT DOCUMENTS

| | | |
|---|---|---|
| DE | 102009036680 A1 | 2/2011 |
| DE | 102009041683 A1 | 3/2011 |

OTHER PUBLICATIONS

European Search Report for corresponding application No. EP 12 18 2671, Jan. 30, 2013, 6 pages.

* cited by examiner

*Primary Examiner* — Alexander Thomas
(74) *Attorney, Agent, or Firm* — Reising Ethington P.C.

(57) ABSTRACT

A trim part for an interior of a vehicle, the trim part having a substantially rigid carrier including a front side and a rear side and a covering arranged on the front side of the substrate. The substrate and the covering are connected to each other by a yarn seam. Also provided is a method for producing such a trim part and a sewing machine for making such a trim part.

14 Claims, 2 Drawing Sheets

TRIM PART AND METHOD FOR PRODUCING A TRIM PART

TECHNICAL FIELD

The invention relates to a trim part, preferably for an interior of a vehicle, the trim part comprising a substantially rigid carrier and a covering arranged on the front side of the carrier wherein the carrier and the covering are connected to each other.

BACKGROUND

Trim parts often include a carrier or substrate which defines the shape of the trim part. The trim part itself is often made from a rigid thermoplastic material such as polypropylene (PP) or acrylonitrile butadiene stryrene (ABS). Other common materials include natural long fibers or short wooden fibers. In order to give the trim part an aesthetic appearance, the substrate or carrier is covered by a covering, which often includes a decorative skin made from leather or polyvinylchloride (PVC). In addition, the covering can include a foam layer or a knitted fabric situated between the decorative skin and a carrier.

For aesthetic reasons, the decorative skin or the entire covering includes stitch lines or seams. The seams are introduced into the covering such that they are visible from the side visible from the interior of a vehicle. After the seams have been introduced into the covering, the covering including the seams is attached to the substrate.

Several methods are known of attaching the coverings to the substrate. Often the covering is laminated onto a front side of the carrier. Other methods include welding the covering onto the carrier or forming the carrier onto the rear, non-visible side of the covering by injection molding. While the latter method prohibits the use of sensitive materials such as leather, the former methods do not solve the problem of locating the stitch lines exactly where the designer of the trim part intends them to be. Arranging the covering including the stitches on the carrier is a very tedious and time-consuming exercise. Even after the covering has been laminated onto the carrier, the seams may change their location due to failures in the lamination, which results in an aesthetically challenged trim part with loose-looking seams.

The prior art shows several of the above-mentioned trim parts. Documents JP 2011/206295 and US 2005/0103247 are cited by way of example.

SUMMARY

According to the claimed subject-matter, the substrate and the covering are connected by a seam such as a yarn seam. By directly connecting the covering to the substrate with the seam, or more particularly the seam that also shows from the visible side (or front side) of the covering, the location of the seam is well defined and cannot shift even in the case that the lamination between the covering and a carrier fails. Additionally, when producing such a trim part, several steps that were necessary in the prior art can be omitted. For example, it is no longer necessary to arrange the covering in the sewing machine and make sure that the seam is located exactly at the desired position, and to arrange the covering including the seam upon the carrier in such a way that the seam introduced into the covering runs along the well-defined geometric shapes of the carrier. In the present invention, the arrangement of the covering on the geometrically shaped substrate needs to be done only once, and the exact location of the seam needs to be determined only once. It is thereby, for example, possible to arrange a large piece of covering onto the substrate, introduce the seam connecting the covering and the substrate and then cut the remaining pieces of the covering to finish combining the substrate and the covering.

Additionally, this application refers to a carrier, which may be used for producing trim part with a covering including or not including yarn seams. The substantially rigid carrier includes a front and a rear side, wherein the carrier comprises at least one guiding structure. In an embodiment of the carrier, the guiding structure is located on the rear side of the carrier. Further embodiments are described in the following examples and embodiments. The substantially rigid carrier in some embodiments includes a continuous surface, preferably a continuous front side of the carrier. In some embodiments, the term "continuous" is understood as a surface, the contour of which does not correspond to the surface contour of the rear side. For example an indentation of the front side does not show on the rear side. In some embodiments "continuous" can be understood as flat or without discontinuous edges on the surface of the front or rear side. In other embodiments, the front side of the carrier has a continuous surface and the rear side of the carrier includes at least one guiding structure.

Several embodiments of the claimed subject-matter are described hereinafter.

In an embodiment of the invention, the seam includes a lock stitch. The upper yarn of the lock stitch seam runs along the visible side of the covering, whereas the back yarn of the lock stitch runs along the rear side of the substrate. By using a lock stitch, the seam can be easily introduced, and as sewing machines applying lock stitches are commonly available, the trim part can be produced with ubiquitously available sewing machines.

In a further embodiment, the yarn is made from a synthetic fiber, or it can be a natural fiber yarn. Depending on the application of the trim part, yarns made from either thermoplastic materials or from natural fiber can be used. The appropriate yarn can also be chosen with regard to the desired look of the finished trim part.

In a further embodiment, the substrate includes a recess, and the yarn seam runs along said recess. By including a recess in the substrate, the thickness of the substrate in the area of the recess is reduced, making it easier for a sewing needle to penetrate the substrate. The recess does not reduce the stability of the trim part, since the recess covers only a limited area of the entire trim part. Hence, while the stability of the trim part is not reduced, the seam can be introduced more easily in the area of the recess.

The recess can be located either on the front side or the rear side of the covering. By placing the recess on the front side of the carrier, the surface of the covering which is visible from the inside of the vehicle shows a small indentation after the stitch line or seam is introduced and the covering and the carrier are connected. When the recess is located on the rear side of the substrate, it can be easily identified, even when the front side of the carrier is already covered with the covering, resulting in an easier alignment of the carrier in a machine for inserting the seam.

A further method of producing the claimed trim part, particularly in connection with the recess, comprises heating an area or the recess of the carrier before inserting the seam. In particular when using a thermoplastic material carrier, the heating softens the carrier and thereby reduces its resistance, making it easier for a needle to penetrate it.

In a further embodiment, the sewing machine for introducing the seam into the trim part comprises a heating device, such as a hot air blower, an ultrasonic heating device, or a heating lamp, so that the substrate, particularly the area into which the seam is to be introduced, such as the recess, can be made to have the exact temperature appropriate for introducing the seam into the trim part. In this embodiment, there is no need for using an extra heating station, transporting the pre-heated substrate from the heating station to the sewing machine, and only then introducing the seam.

In a further embodiment, the carrier, at least in the area surrounding the seam, has a hardness of more than 45 Shore D. The carrier should have an appropriate hardness or stiffness to fulfill the demands placed on modern vehicles. Since the carrier may also carry further devices connected to either its front or rear side, an appropriate hardness is again necessary to meet these additional requirements.

The carrier is preferably made of thermoplastic polyolefin material, homopolymer or copolymer, comprising optionally mineral fillers or reinforcement by glass fibers or natural fibers, or styrenic material, as for example ABS-PC (acrylonitrile-butadiene-styrene and polycarbonate), optionally reinforced by glass fibers. These materials have a stiffness enabling to fulfill a supporting function.

In a further embodiment, the carrier includes at least one guiding structure, preferably on the rear side of the carrier. The guiding structure can be used either by itself or in connection with a guiding mechanism, for example, one included in a sewing machine, for advancing the substrate so that a needle of a sewing machine inserts the seam in the desired area. The guiding structure can be, for example, a guiding rib or a guiding channel. In the case of a guiding rib, the corresponding guiding mechanism of the sewing machine could be, for example, a channel that includes transporter mechanisms. In particular, the guiding mechanism can correspond to the geometric shape of the seam to be introduced, so that transporting the substrate along the guiding structure shifts and moves the carrier without the need to move the needle of the sewing machine.

In a further embodiment, a part of the covering not including the visible decorative layer of the covering is attached to the carrier, and the decorative skin is attached to the further layers of the covering later on.

In a further embodiment, the tension of the yarn of the seam is chosen such that an indentation on the visible side of the covering shows, resulting in an aesthetically desirable look of the covering.

The covering can be a multi-layer covering, including, for example, a decorative layer made from a PVC slush skin with or without a graining structure, and further an intermediate foam layer or a knitted fabric layer or a gel foil. The foam layer, the knitted fabric, or the foil improves the haptics of the covering and results in an aesthetically desirable trim part.

The decorative layer can be made from different material such as PVC, leather, fabric, thermoplastic polyolefin, ligneous material, plastisol.

Even though the claims cover only a trim part and a method for producing a trim part, the invention also covers a sewing machine with a movable needle or without a movable needle (where "movable" refers not to the up-and-down movement of the needle but to a movement of the needle in a plane vertical to said up-and-down movement) including a guiding mechanism, such as a guiding channel or a guiding rib, including transporter mechanisms and a heating device which is located on the sewing machine so that it pre-heats a substrate before the needle penetrates said substrate.

In the following, the invention will be described by means of several examples. While the examples include a number of details of the trim part, the method, or the sewing machine, not all details shown in the drawings are necessary for defining the invention. Hence, the separate details shown in the drawings can be claimed separately and independently later on.

DETAILED DESCRIPTION OF THE ILLUSTRATED EMBODIMENTS

Figure 1A:
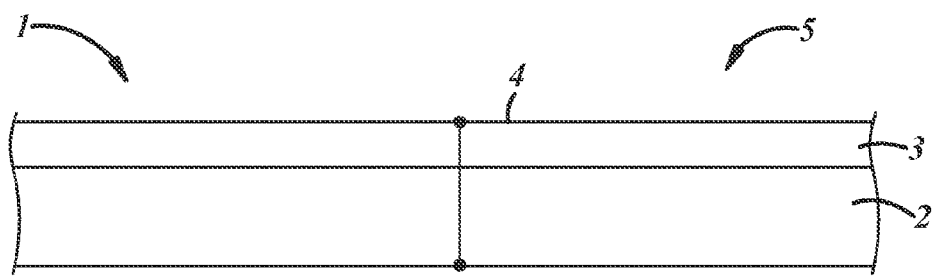
FIGS. 1a-1c schematically illustrate a cross-section through a trim part.

FIG. 1a schematically illustrates a layered construction of a trim part according to the invention. The trim part 1 comprises a PP carrier 2 with a Shore D hardness of 55.

On the front side of the carrier 2, a covering 3 is situated, the covering 3 being made of a leather layer. The visible side 5 of the covering 3 can be seen from the inside of a vehicle when the trim part is part of said vehicle.

The covering 3 includes a seam 4 that not only penetrates the covering 3 but also the carrier 2. The seam 4 is a lockstitch seam that includes a front yarn visible on the visible side of the covering and a back yarn visible from the rear side of the carrier. Both yarns interlock and thereby form the seam. Either the front or the back yarn penetrates the substrate. The tension of the seam is such that there is no visible indentation on the visible side 5 of the covering 3. By interweaving the front and back yarns at higher tensions than the tensions used when creating the schematic trim part of FIG. 1a, an indentation shows on the visible side 5 of the trim part 1.

Figure 1B:
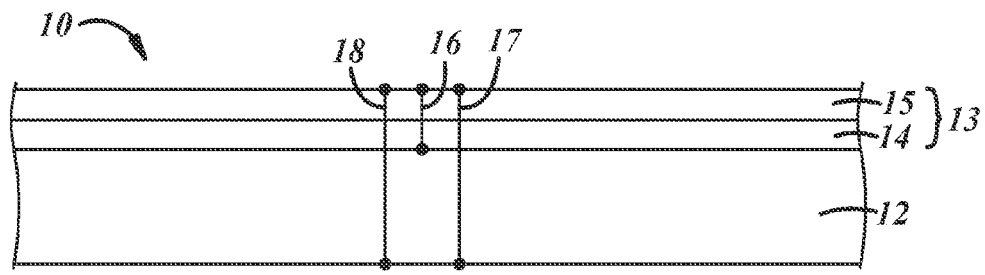

FIG. 1b shows a trim part 10 according to the invention that has a more complicated structure. The trim part 10 includes an ABS carrier 12 that has a thickness of approximately 5 millimeters. Generally, the thickness of the carrier can be between 2 millimeters and several centimeters. On the front side of the carrier 12, a covering 13 is arranged. The covering 13 includes a foam layer 14, which faces the front side of the carrier, and a decorative skin 15 made of PVC. The covering 13 includes a seam 16 that connects the two layers of the covering. After including seam 16 in covering 13, the covering is placed on the carrier 12, and seams 17 and 18 are introduced through the covering 13 and the carrier 12. While seam 16 does not penetrate the carrier 12 and can also be made with a Class 300 stitching pattern, both seams 17 and 18 are made with lockstitches. The yarn used for seam 16 is a synthetic yarn while at least one of the seams 17 and 18 is a natural fiber yarn. The yarns can be of different color and of different thickness.

Figure 1C:
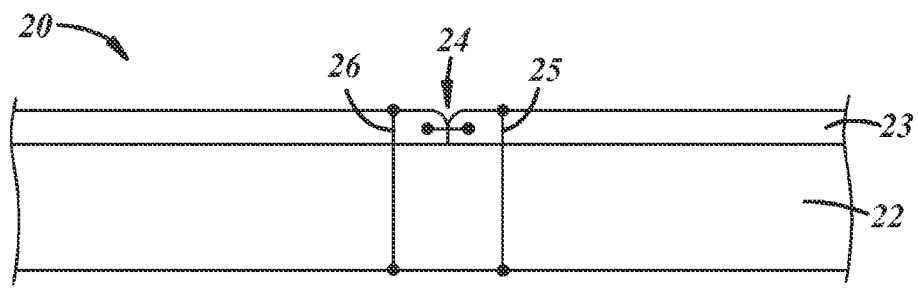

FIG. 1c shows a further example of a trim part 20 including a carrier 22 and a covering 23. The covering 23 comprises two parts that are connected by a seam 24. The two parts of covering 23 may be of different materials and/or of different color and/or may be different in any other visual or haptic parameter. The seam 24 is introduced before the covering is placed upon the carrier. When the covering 23 is placed upon the carrier, the seams 25 and 26 are introduced to connect the covering 23 and the carrier 22.

Figure 2A:
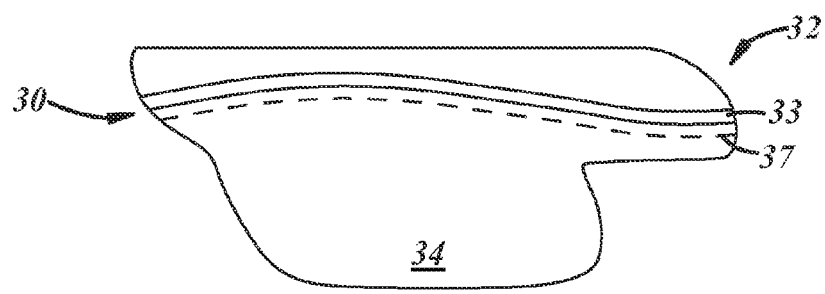
FIGS. 2a-2b show the rear side of a substrate and cross-section of a trim part including a guiding structure.

In FIG. 2, a further example of a trim part according to the invention is shown. FIG. 2a shows a trim part 30, in particular the carrier 32, which includes a recess 33 located on the rear side 34. In addition, a guiding rib 37 is shown, the guiding rib 37 running parallel to the recess 33, i.e., following the geometric stitchline. Other geometries of the rib, such as straight lines, are possible but may require a sewing machine with a laterally movable needle. The trim part 30 is a door panel for a vehicle. Other trim parts, such as parts of a dashboard, an instrument panel, a middle console, or the like, can also be made with the claimed subject-matter.

Figure 2B:
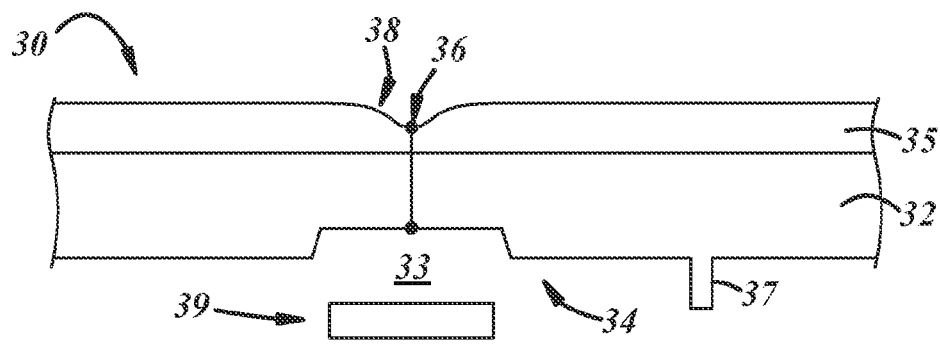

FIG. 2b shows a cross-section of trim part 30 made through the area surrounding the recess 33. The recess 33 of carrier 32 has a lower thickness than the area surrounding the recess. A covering 35 is introduced onto carrier 32, and a seam 36 is introduced, the tension of the seam yarn being such that an indentation 38 is visible on the visible side of covering 35.

On the rear side 34 of carrier 32, the guiding rib 37 is also shown. Furthermore, FIG. 2b discloses a heating mechanism 39, which, prior to introduction of the seam, heats the recess, for example by hot air, up to a temperature of 50-120° C., preferably less than 80° C., so that a needle inserting the seam can penetrate the substantially rigid carrier more easily. Alternative heating mechanisms may be heating lamps or ultrasonic or infrared heating mechanisms.

Figure 3:
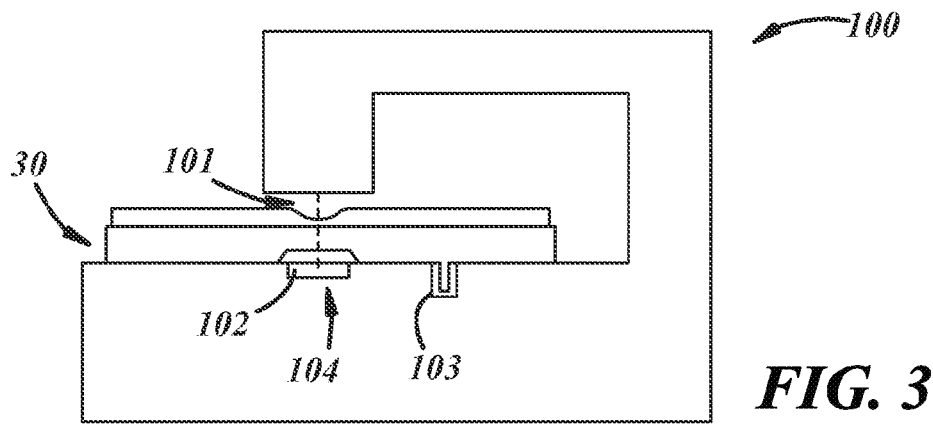
FIG. 3 shows a sewing machine.

FIG. 3 is a schematic representation of a sewing machine 100, which includes a needle 101 for carrying the upper yarn and a lower mechanism 102 for providing the second yarn and interlocking the two yarns with each other. In between the two needles, the exemplary trim part 30 is shown. The guiding rib 37 can also be easily identified, the guiding rib being held in a guiding mechanism 103 including a guiding channel and a transport mechanism (not shown) for moving the trim part further towards the plane of projection. Because the trim part is transported along the guiding rib 37, the needles 101 and 102 do not have to move laterally.

Additionally, the sewing machine may include a heating mechanism, such as a hot air blower, for heating the area in which the seam is to be introduced into the carrier. In the example of trim part 30, said area includes recess 33, or it may be a specified part of recess 33.

Figure 4:
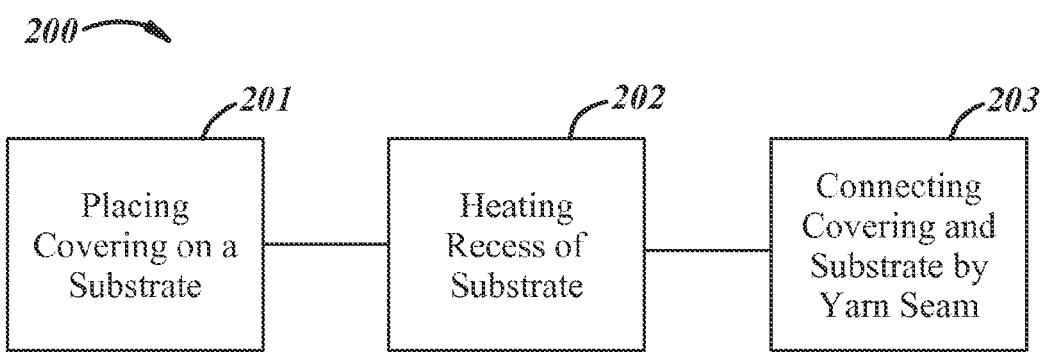
FIG. 4 shows a process diagram of an exemplary method.

FIG. 4 schematically illustrates the process of producing a trim part. The method 200 includes placing a covering on a substrate in step 201. Optionally, a recess of the substrate may be heated to more easily introduce the seam into the substrate.

Thereafter, the covering and the substrate are connected to each other by introducing the yarn seam in step 203.

The invention claimed is:

1. Trim part for an interior of a vehicle, the trim part comprising a substantially rigid carrier including a front side and a rear side and a covering arranged on the front side of the carrier,
   wherein the carrier and the covering are connected by a yarn seam and the substantially rigid carrier comprises at least one guiding structure;
   wherein the yarn seam penetrates the substantially rigid carrier thereby extending between the covering and the rear side of the rigid carrier and the yarn seam runs inside a recess of the substantially rigid carrier; and
   wherein the at least one guiding structure is on the rear side of the carrier and includes at least a guiding rib or a guiding channel.

2. Trim part according to claim 1, wherein the seam includes a lock stitch.

3. Trim part according to claim 1, wherein the yarn is a synthetic fiber or a natural fiber yarn.

4. Trim part according to claim 1, wherein the recess is located on the back side of the substantially rigid carrier.

5. Trim part according to claim 1, wherein the substantially rigid carrier at least in a surrounding of the seam has a hardness of more than 45 Shore D.

6. Trim part according to claim 1, wherein the substantially rigid carrier is made of thermoplastic polyolefin material or styrenic material comprising optionally fillers and/or fibers reinforcement.

7. Trim part according to claim 1, wherein the yarn seam penetrates a visible frontside of the covering.

8. Trim part according to claim 1, wherein the covering includes at least a decorative layer, and further at least one of an intermediate foam layer, a knitted fabric layer or a foil.

9. Trim part according to claim 8, wherein the decorative layer comprises at least one of a fabric, leather, polyvinylchloride (PVC), thermoplastic polyolefin (TPO), plastisol, ligneous material.

10. Method for producing a trim part for a vehicle, wherein a covering is placed upon a front side of a substantially rigid carrier and a yarn seam is introduced, connecting the covering and the carrier and the substantially rigid carrier includes a guiding structure on the rear side of the carrier and includes at least a guiding rib or a guiding channel, where the guiding structure corresponds to a guiding mechanism of a sewing machine, wherein the yard seam penetrates the substantially rigid carrier thereby extending between the covering and the rear side of the rigid carrier and the yarn seam is introduced and runs inside a recess of the substantially rigid carrier.

11. Method according to claim 10, wherein the substantially rigid carrier comprises a thermoplastic material and an area of the carrier along which the seam is to be located is heated prior to introducing the seam, the area lying inside the recess or including the recess.

12. Trim part for an interior of a vehicle, the trim part comprising a substantially rigid carrier including a front side and a rear side and a covering arranged on the front side of the carrier,
   wherein the carrier and the covering are connected by a seam and the substantially rigid carrier comprises at least one guiding structure; and
   wherein the seam penetrates a recess of the substantially rigid carrier thereby extending between the covering and the rear side of the recess of the rigid carrier and the seam runs along said recess.

13. Trim part according to claim 12, wherein the seam comprises a yarn seam.

14. Trim part according to claim 12, wherein the at least one guiding structure is on the rear side of the carrier and includes at least a guiding rib or a guiding channel.

* * * * *